Nov. 26, 1957 E. A. VOLK, JR 2,814,252
ACCUMULATOR
Filed Dec. 31, 1952
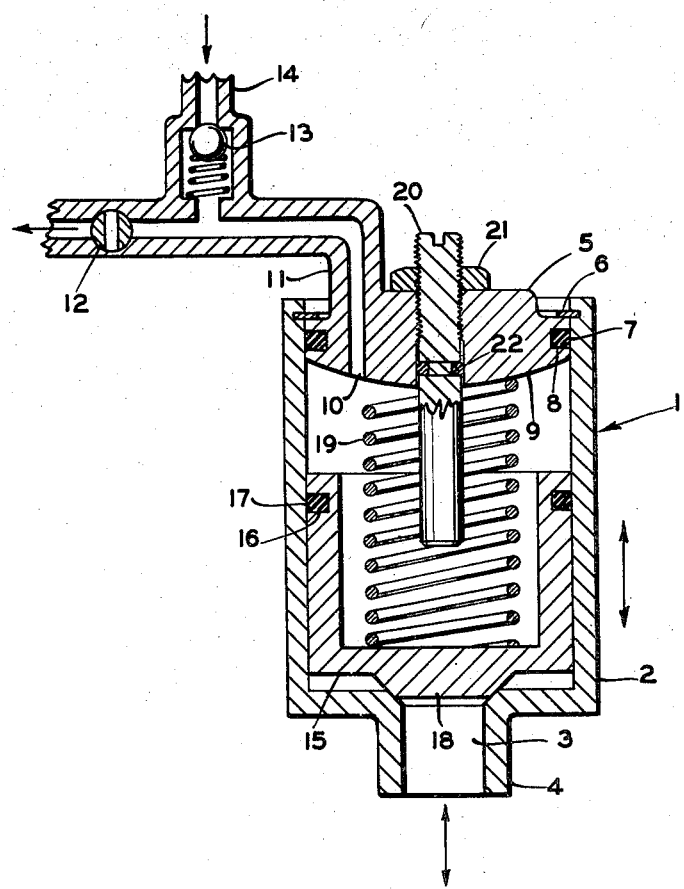
INVENTOR.
EMIL A. VOLK JR.
BY
ATTORNEY

United States Patent Office 2,814,252
Patented Nov. 26, 1957

2,814,252

ACCUMULATOR

Emil A. Volk, Jr., Hasbrouck Heights, N. J., assignor to Bendix Aviation Corporation, Teterboro, N. J., a corporation of Delaware Application December 31, 1952, Serial No. 329,050

7 Claims. (Cl. 103—138)

The present invention relates to fuel tanks and more particularly to variable volume tanks which deliver the contained liquid under the impetus of a second liquid under pressure.

In certain applications, such for example as a combustion starter utilizing a mixture of fuel and air under pressure, it is desirable to be able to regulate the quantity of fuel delivered. Heretofore various types of fuel tanks or accumulators have been used. An elastic diaphragm was used to separate the air compartment from the fuel compartment. In accumulators of this type there was no practical way to regulate the quantity of fuel delivered.

The present invention provides an accumulator having a piston to separate the fuel and air and means for adjusting the travel of the piston thereby varying the quantity of fuel delivered. In addition the piston acts as a valve to prevent fuel from escaping into the air duct when the air pressure is shut off.

It is an object of the present invention to provide an improved fuel accumulator.

Another object of the invention is to provide an improved accumulator in which the volume of fuel delivered may be varied.

Another object of the invention is to provide an accumulator having a positive seal from leakage when filled and awaiting use.

The above and other objects and features of the invention will appear more fully hereinafter from a consideration of the following description taken in connection with the accompanying drawings wherein one embodiment of the invention is illustrated by way of example.

In the drawing:

The single figure is a cross section view of an accumulator embodying the invention.

In the drawing an accumulator is indicated generally by the numeral 1 and has a housing 2. The housing 2 has an opening 3 in one end thereof with a shank portion 4 adapted to be connected in a conventional manner to a source of compressed air (not shown). The other end of the housing 2 is fitted with a closing plate 5 secured in position by a snap ring 6. A sealing ring 7 positioned in a groove 8 in the plate 5 prevents leakage of fuel from the accumulator 1. The inner side of the plate 5 is provided with a convex surface 9.

A passageway 10 extends through the plate 5 and is connected by a conduit 11 to a combustion chamber (not shown) through a valve 12. The valve 12 may be solenoid operated from the starter control system (not shown). A check valve 13 and conduit 14 connect the conduit 11 to a fuel supply (not shown).

A substantially cross-sectionally U-shaped piston 15 is adapted to fit inside of the housing 2 and is provided with a groove 16. A sealing ring 17 is fitted in the groove 16 and is compressed between the piston 15 and the housing 2. The piston 15 has a projection 18 adapted to fit into the opening 3 and cooperates with the housing 2 to form a seal for the opening 3. A spring 19 normally biases the piston 15 towards the opening 3 so that the projection 18 closes the opening.

The travel of the piston 15 away from the opening 3 is limited by a screw member 20 threaded into the cover 5. A lock nut 21 permits locking the screw 20 in any selected position. A seal ring 22 may be provided between the cover 5 and the screw 20.

In operation upon the air pressure being shut off, the spring 19 biases the piston 15 in a direction to cause the projection 18 to seal off the opening 3. Fuel from the fuel supply enters through the check valve 13 and fills the accumulator 1. The convex surface of the lid 5 prevents air from being trapped therein. Upon the air pressure being turned on and the valve 12 opened, the piston 15 is forced towards the cover 5 against the bias of the spring 19 to force the liquid out through the conduit 11 and valve 12. The screw 20 limits the travel of the piston 15 and thereby the quantity of liquid expelled thereby.

In order to provide a better seal it is understood that the projection 18 may be covered with any suitable material to provide a good seat.

Although only one embodiment of the invention has been illustrated and described, various changes in the form and relative arrangement of the parts, which will now appear to those skilled in the art, may be made without departing from the scope of the invention.

What is claimed is:

1. In a fuel accumulator of the character described, a housing open axially in its bottom wall, and providing a beveled seat about the inner end of the same, and the housing being open in its top and provided with a removable cover sealing the same, a fuel output conduit line in communication with a passage that communicates through the top of the cover with a relatively large chamber formed by the walls of the housing, a fuel input line controlled by a spring and ball check valve in lateral communication with the conduit line, a cup valve member axially slidable in the chamber with its side wall in sliding contact with the chamber wall, a frusto conical extension on the bottom wall of the valve member adapted for sealing engagement with the beveled seat, a coil spring contained in the cup portion of the valve member and loaded between the bottom of the cup and the cover to constantly urge the valve's conical extension into engagement with the seat, a stop member extending axially into the chamber from the cover, the valve member adapted to slide upwards against the load of the spring under pressure of air passing through the bottom opening and with such action to force fuel from the chamber through the cover passage to the conduit output line, the inner bottom of the valve cup adapted to limit against the stop member, whereby the quantity of fuel discharged is limited by the relative position of the stop member with respect to the cup's inner bottom, the loaded spring adapted to restore the valve to sealing engagement with the seat upon cutting off the pressure air flow to the bottom opening, and the bottom wall of the housing being provided with an adapter for communicating the bottom opening with a supply of pressure air.

2. In a fuel accumulator as in claim 1, wherein the side wall of the cup valve member is provided with a seal ring to prevent escape of air between the chamber wall and the valve member to the fuel side of the chamber, and the under surface of the cover is characterized as convexed in form whereby any air possibly escaping to the fuel side of the housing chamber will be trapped in the chamber between the tapered edge of the convexed cover and the chamber wall and thereby prevented from mixing with the fuel outflow.

3. In a fuel accumulator as in claim 1, wherein the upper end of the stop member is threadedly contained in a hole in the cover and extends above it and is provided with external lock nut and screw driven slot means whereby the extended position of the stop in the chamber may be adjusted and the quantity of the fuel discharged controlled to a certain desired amount.

4. In a fuel accumulator as in claim 3, wherein the cover is of thickened proportions sufficient to receive a substantial shank portion of the upper end of the stop member, wherein the upper portion of the cover's axial hole is threaded and the upper end portion of stop is threaded for engagement with the latter, wherein the lower portion of the wall of the cover hole is smooth and the shank carries a seal ring for sealing engagement with the smooth wall of the cover hole whereby the cover hole is sealed against the escape of fuel about the stop member to the outside.

5. In a housing of the character described including a cylindrical cavity, a cover of thickened proportions closing over the top of the cavity to form a chamber and having a hole through the top of the cover adapted to receive and discharge fuel from the chamber, a piston axially slidable in sealing contact with the side wall of the chamber to force fuel under pressure through the hole, and an adjustable stop member extending axially from a bore through the cover into the chamber to limit the extent of upward movement of the piston and the consequent discharge of fuel through the cover hole, the stop member being an elongated rod threaded at its upper portion for engagement with a threaded upper portion of the bore, the bore being smooth in its lower portion, and the rod carrying a seal ring about a smooth portion thereof below the threaded portion for sealing contact with the smooth part of the bore, whereby the cover is sealed against escape of fuel about the stop member through the bore, the threaded end of the stop member being of sufficient length to provide a portion extending above the cover and provided with means for adjusting the position of the stop member in the chamber relative to the piston, and external lock nut means abutting said cover for setting the adjusted position of the stop member.

6. An improved leak-proof fuel accumulator for delivering a predetermined quantity of fuel by a gas-actuated piston; said accumulator being comprised of a housing having cylindrical chamber which has a fuel inlet-outlet at one end in a top wall of said housing and a gas inlet-outlet at the other end; a cylindrical-surfaced piston in said chamber having the bottom wall of said piston facing said axial gas inlet-outlet and having the entire side wall of said piston in close proximity to the side wall of said cylindrical chamber; said piston bottom wall and said axial gas inlet-outlet having cooperating valve means for opening and closing said axial gas inlet-outlet; means associated with said piston for normally biasing said piston towards said axial gas inlet-outlet; said piston having axial cylindrical bore above said bottom wall thereof; said means for biasing being a spring positioned principally within said cylindrical bore and between said top wall and the bottom wall of said piston; adjustable piston-stop means extending through said top wall along the axis of said spring for contacting the inner surface of the bottom wall of said piston; the inner surface of the top wall of said housing being convex; and said fuel inlet-outlet being located in the radially-intermediate part of the top wall of said housing.

7. The accumulator in accordance with claim 6 and said piston having an annular peripheral groove adjacent the top thereof containing a seal which contacts said side wall of said cylindrical chamber.

References Cited in the file of this patent

UNITED STATES PATENTS

| | | |
|---|---|---|
| 1,290,941 | Eckert | Jan. 14, 1919 |
| 1,375,200 | Barnickel | Apr. 19, 1921 |
| 1,494,381 | Sebring | May 20, 1924 |
| 1,849,060 | Dodson | Mar. 15, 1932 |
| 1,869,874 | Voorhees | Aug. 2, 1932 |
| 2,271,022 | Nelson | Jan. 27, 1942 |
| 2,300,110 | De Hoog | Oct. 27, 1942 |
| 2,497,300 | Elliott | Feb. 14, 1950 |
| 2,576,747 | Bryant | Nov. 27, 1951 |
| 2,578,992 | Dickey | Dec. 18, 1951 |
| 2,706,950 | Becker | Apr. 26, 1955 |

FOREIGN PATENTS

| | | |
|---|---|---|
| 437,980 | Great Britain | Nov. 8, 1935 |